E. E. HOSMER.
BICYCLE PROPELLED CHAIR.
APPLICATION FILED JUNE 11, 1912.
1,059,466.
Patented Apr. 22, 1913.
2 SHEETS—SHEET 1.
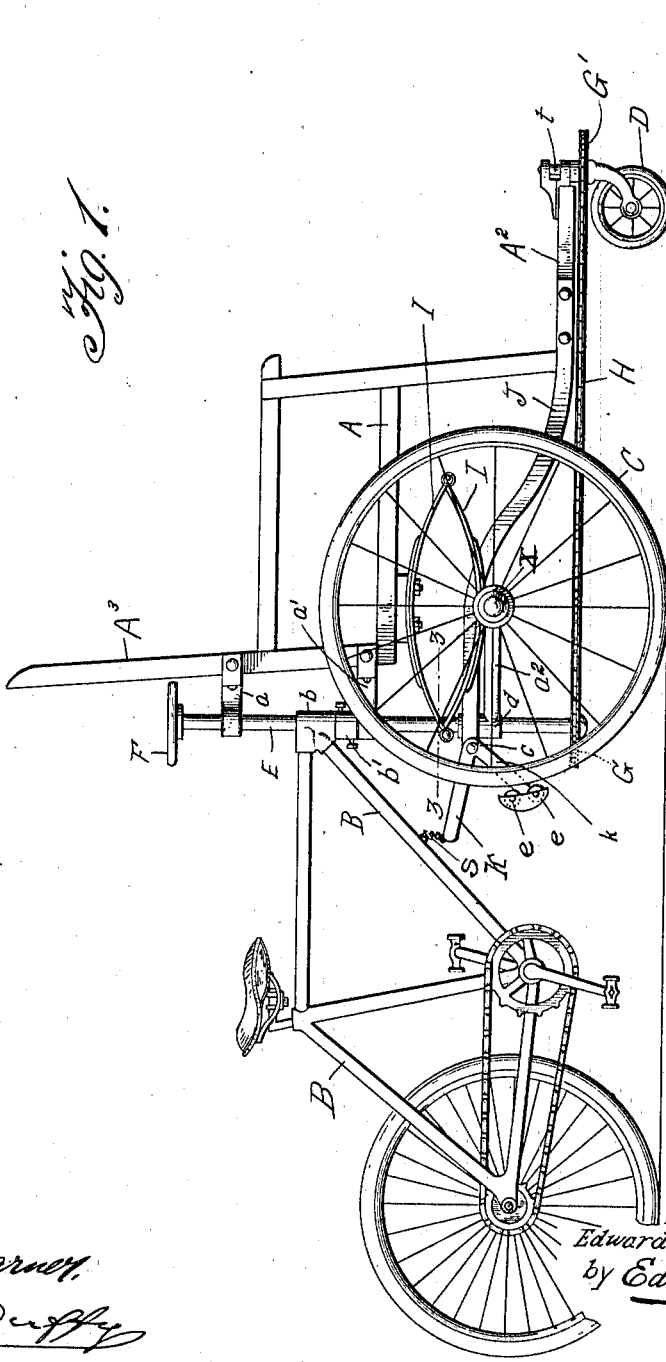
WITNESSES
INVENTOR
Edward E. Hosmer.
by Edw. W. Byrn.
Attorney

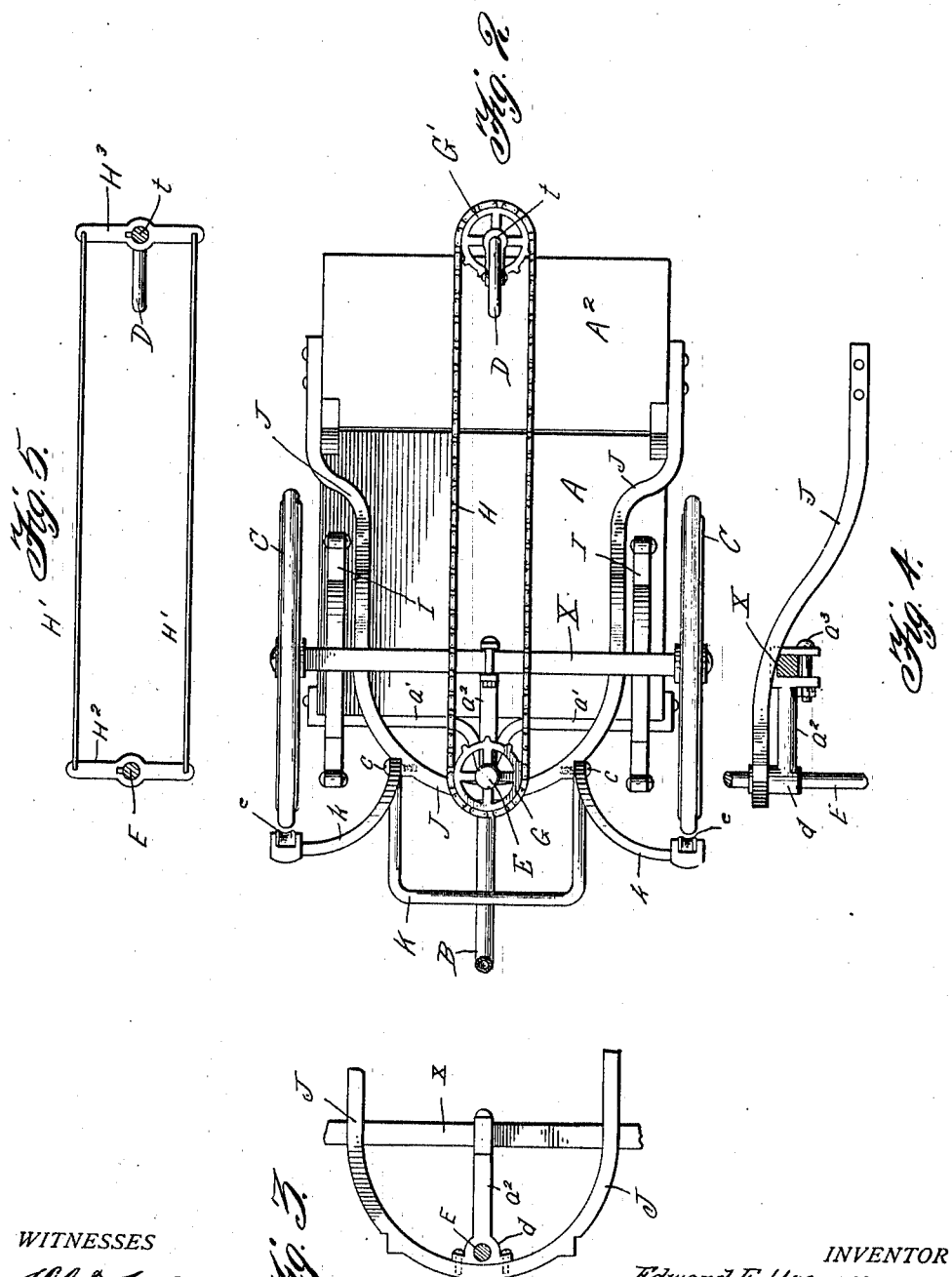

UNITED STATES PATENT OFFICE.

EDWARD E. HOSMER, OF EAST LYNN, MASSACHUSETTS.

BICYCLE-PROPELLED CHAIR.

1,059,466.  Specification of Letters Patent.  Patented Apr. 22, 1913.

Application filed June 11, 1912. Serial No. 703,051.

*To all whom it may concern:*

Be it known that I, EDWARD E. HOSMER, a citizen of the United States, residing at East Lynn, in the county of Essex and State of Massachusetts, have invented certain new and useful Improvements in Bicycle-Propelled Chairs, of which the following is a specification.

My invention relates to bicycle-propelled chairs, or carrier velocipedes, which embody a carrier body in the form of a chair or receptacle, combined with a bicycle attachment adapted to be operated by a person for the purpose of propelling the carrier.

My invention consists in the novel construction and arrangement of such device designed to enable the operator to steer the chair or carrier, with greater ease and sensitiveness, also to permit the independent use of the chair without its propelling attachment, and to provide a simple and practical form of brake for enabling the operator to control the speed, or quickly stop the chair, without getting off the seat of the bicycle attachment, all as hereinafter more fully described with reference to the drawings in which:

Figure 1 is a side elevation of the entire device; Fig. 2 is an inverted plan view of the chair alone; Fig. 3 is a sectional detail in plan view, on line 3—3 of Fig. 1; Fig. 4 is a sectional side view of the parts shown in Fig. 3, and Fig. 5 is a detail, in plan view, of a modified form of the steering gear.

In the drawings, A represents the seat, $A^2$ the foot board, and $A^3$ the back of any ordinary form of roller chair. This chair is supported by springs I under the seat resting upon and secured to the axle X which at its ends is provided with the running wheels C C. At the forward end the chair is supported upon a trailing wheel D arranged beneath the foot board and carried in the fork of a short vertical axial shaft $t$.

Projecting from the rear of the back $A^3$ are two horizontal brackets $a$ and $a'$, which at their ends connect with the side members of the chair back, as seen in Fig. 2, and in the middle have an offset portion to the rear, which is provided with bearings for an upright shaft E. At a lower point an arm $a^2$ is detachably connected to the axle, see Fig. 4, by a yoke and clamping bolt $a^3$ and at its rear end has a vertical bearing $d$ through which the shaft E passes and slides up and down as the chair moves up and down from the weight of the occupant and the yielding of the springs.

On the upper end of the shaft E is rigidly fixed a steering wheel F and on the lower end of this shaft is a sprocket wheel G. To the shaft E between the brackets $a$, $a'$ is pivotally connected a bicycle attachment B, consisting of the usual frame, rear wheel, treadle, sprocket wheels, chain and rider's saddle. The front end of the frame of the bicycle attachment is provided with a coupling bearing $b$ which embraces the upright shaft E with a pivotal connection and rests upon a spacing sleeve $b'$ which in turn rests upon the bearing of the lower bracket $a'$.

H is an endless chain belt which passes around the sprocket wheel G at the lower end of the steering shaft E and then extends forwardly in substantially horizontal position beneath the chair and foot board to a sprocket wheel $G'$ fixed rigidly to the short shaft $t$ of the front trailing wheel D.

J is a U-shaped metal frame whose forward ends are bolted to the side edges of the foot board and whose side members are then extended to the rear, being bent inwardly as seen in Fig. 2, to pass inside the springs I, and then upwardly as in Fig. 1 to pass over the axle, terminating in a bow or loop in the rear. This rear loop of this frame forms a bracing attachment to the rear end of the arm $a^2$ which carries the lower bearing $d$ for the steering shaft, as seen in Figs. 3 and 4, the bearing $d$ being formed with lugs to receive bolts that fasten it to the loop, as seen in Fig. 3. To the rear of the loop J is also pivotally attached a brake K. This consists of a bent, double cranked, bar whose middle loop portion passes under the forward end of the bicycle frame in convenient position for the feet of the rider and which is connected by pivot bolts $c$ $c$ to connections formed on the rear loop of frame J, as seen in Fig. 2. The outer ends $k$, $k$, of this double cranked bar are provided with brake shoes, each carrying two soft rubber rollers $e$, $e$, lying in the plane of and adapted to bear against the peripheries of the two supporting wheels C, C. Normally these rollers $e$, $e$, are held away from the wheels C, C, by means of a suitable spring, which may be a spiral tension spring $s$, Fig. 1, connecting the rear loop of the brake bar to the lower front member of the bicycle frame.

The operation, important distinctions and great advantage of my chair are as follows: The chair is propelled by the rider on the bicycle attachment. To turn or steer the chair, it is only necessary to turn the wheel F and this through shaft E, chain H, and front wheel D steers the chair around in a most sensitive manner, and with but little effort from the operator, because he does not have to overcome the inertia of the chair and its occupant, as when the steering is effected by turning the chair and its occupant bodily as heretofore. Furthermore, the act of steering does not involve any reactionary lateral thrust on the bicycle attachment, as when the chair is turned directly and bodily. This reactionary thrust has a tendency to throw the bicycle wheel over, which is entirely obviated by my invention, in which the operator does not have to overcome the inertia of the chair and its occupant, but the load responds easily and sensitively to the guiding influence of the front wheel, without tiring the operator or deflecting the plane of the bicycle attachment by reactionary thrust.

In carrying out my invention, I do not confine myself to the use of a sprocket chain H, but, as in Fig. 5, I may use two parallel rods H' H' connected in the rear to the opposite ends of a rigid cross head H² on shaft E and at the front end to a rigid cross head H³ on the shaft of the front steering wheel, or any other equivalent mechanical connection, the main feature being the connection of a front steering wheel beneath the foot board to an upright steering shaft behind the chair by a connecting mechanism passing under the chair and foot board.

I may also modify the construction and arrangement of the parts in many other ways without departing from the scope of my invention as set forth in the claims.

I claim:

1. A carrier velocipede, comprising a carrier body, an upright rotary steering shaft in rear of the same, a person-propelled bicycle attachment arranged in rear of the shaft, and attached thereto, two supporting wheels arranged beneath the carrier, a guiding wheel in front of the carrier body and a steering mechanism connecting the front steering wheel with the rear upright shaft and passing underneath the carrier body.

2. A treadle-propelled chair, comprising a chair body with seat, springs below the seat, an axle, with wheels, supporting the springs, a foot board arranged below the chair seat, an upright rotary steering shaft in rear of the chair, a bicycle frame with seat, wheel, and treadle mechanism, pivotally connected at its forward end to the upright shaft, a steering wheel arranged beneath the foot board and in front of the chair and steering mechanism below the foot board and chair connecting said wheel to the lower end of the upright shaft.

3. A treadle propelled chair, comprising a chair body with seat, springs below the seat, an axle with wheels supporting the springs, a foot board arranged below the chair seat, an upright rotary steering shaft in rear of the chair, a bicycle frame with seat, wheel, and treadle mechanism, pivotally connected at its forward end to the upright shaft, a steering wheel arranged beneath the foot board and in front of the chair and steering mechanism below the foot board and chair connecting said wheel to the lower end of the upright shaft consisting of a rigid sprocket on the lower end of the shaft, a rigid sprocket wheel on the vertical axis of the front wheel and a chain belt connecting the two sprocket wheels.

4. A bicycle-propelled chair, comprising a chair having rearwardly projecting brackets attached to its back and provided with bearings, an axle with springs mounted on the axle and supporting the chair wheels for said axle, a rearwardly extending arm attached to the axle and provided with a bearing, a vertical shaft arranged in the bearings of the brackets and arm, a bicycle attachment pivotally connected to the shaft between the brackets, a steering wheel arranged in front of the chair and a steering gear passing under the chair and connecting the shaft with the front wheel.

5. A bicycle-propelled chair, comprising a chair having a bearing for a vertical shaft attached to its back, springs beneath the chair, an axle supporting the springs, two wheels for the axle, a bearing for a vertical shaft attached to the axle, a vertical shaft mounted in said bearings, a steering wheel arranged below and in front of the chair, a steering gear arranged below the chair and connecting the shaft and front wheel and a treadle-driven wheeled attachment pivotally connected to the vertical shaft.

6. A bicycle-propelled chair, comprising an axle, wheels for the same, a chair mounted on the axle and having bearings for a vertical shaft attached to its back, another bearing for such shaft attached to the axle and projecting rearwardly therefrom, a U-shaped brace for the same having its side members attached to the chair, a vertical shaft arranged in said bearings, a bicycle attachment pivotally connected to the vertical shaft, a steering wheel arranged in front of the chair and a steering gear connecting the lower end of the shaft to the steering wheel.

7. A bicycle propelled chair, comprising a chair mounted on two wheels, a vertical steering shaft attached to the rear of the chair, a bicycle attachment pivotally connected to the rear of the chair through said shaft, a front steering wheel, means for connecting it to the lower end of the vertical shaft and a brake for the supporting wheels of the chair projecting to the rear into range of engagement by the feet of the operator on the bicycle attachment.

8. A bicycle propelled chair, comprising a chair mounted on two wheels, a vertical steering shaft attached to the rear of the chair, a bicycle attachment pivotally connected to the rear of the chair through said shaft, a front steering wheel, means for connecting it to the lower end of the vertical shaft and a brake for the supporting wheels of the chair projecting to the rear into the range of engagement by the feet of the operator on the bicycle attachment, said brake consisting of double cranks with brake shoes on their ends, and a U-shaped frame for forming a fulcrum base for said brake, said U-shaped frame being attached to the chair.

In testimony whereof I affix my signature in presence of two witnesses.

EDWARD E. HOSMER.

Witnesses:
 MORRIS M. GORSON,
 MIRA E. CALDWELL.

---

Copies of this patent may be obtained for five cents each, by addressing the "Commissioner of Patents, Washington, D. C."